United States Patent
Lee et al.

(10) Patent No.: US 9,984,280 B2
(45) Date of Patent: May 29, 2018

(54) OBJECT RECOGNITION SYSTEM USING LEFT AND RIGHT IMAGES AND METHOD

(75) Inventors: Ji Hyo Lee, Gyeonggi-do (KR); Kuk Jin Yoon, Gwangju (KR); Woo Sup Han, Gyeonggi-do (KR)

(73) Assignees: Samsung Electronics Co., Ltd., Gyeonggi-do (KR); Gwangju Institute of Science and Technology, Gwangju (KR)

( * ) Notice: Subject to any disclaimer, the term of this patent is extended or adjusted under 35 U.S.C. 154(b) by 730 days.

(21) Appl. No.: 12/961,840

(22) Filed: Dec. 7, 2010

(65) Prior Publication Data

US 2011/0134221 A1    Jun. 9, 2011

(30) Foreign Application Priority Data

Dec. 7, 2009  (KR) .......................... 10-2009-120692

(51) Int. Cl.
*H04N 13/02*   (2006.01)
*G06K 9/00*    (2006.01)
*G06T 7/593*   (2017.01)

(52) U.S. Cl.
CPC .......... *G06K 9/00201* (2013.01); *G06T 7/593* (2017.01); *G06T 2207/10012* (2013.01)

(58) Field of Classification Search
CPC ...................... H04N 13/0239; H04N 13/0055
USPC ......................................................... 348/46
See application file for complete search history.

(56) References Cited

U.S. PATENT DOCUMENTS

| | | | | |
|---|---|---|---|---|
| 5,606,627 | A * | 2/1997 | Kuo ............................. | 382/154 |
| 6,901,163 | B1* | 5/2005 | Pearce et al. ................. | 382/165 |
| 2001/0019628 | A1* | 9/2001 | Fujimoto et al. ............. | 382/225 |
| 2006/0221072 | A1* | 10/2006 | Se et al. ....................... | 345/420 |
| 2007/0217676 | A1* | 9/2007 | Grauman et al. ............. | 382/170 |
| 2007/0217683 | A1* | 9/2007 | Kinoshita .................... | 382/190 |
| 2010/0021014 | A1* | 1/2010 | Bebis ........................... | 382/115 |

FOREIGN PATENT DOCUMENTS

| | | |
|---|---|---|
| JP | 2002-083297 A | 3/2002 |
| JP | 2007-249592 A | 9/2007 |
| KR | 10-2004-0005895 A | 1/2004 |
| KR | 10-2005-0027796 A | 3/2005 |

OTHER PUBLICATIONS

Korean Office Action dated Dec. 29, 2016 for corresponding KR Application No. 10-2009-0120692.
(Continued)

*Primary Examiner* — Chikaodili E Anyikire
(74) *Attorney, Agent, or Firm* — Harness, Dickey & Pierce, P.L.C.

(57) ABSTRACT

Disclosed herein are an object recognition system and method which extract left and right feature vectors from a stereo image of an object, find feature vectors which are present in both the extracted left and right feature vectors, compare information about the left and right feature vectors and the feature vectors present in both the extracted left and right feature vectors with information stored in a database, extract information of the object, and recognize the object.

13 Claims, 7 Drawing Sheets

(56) References Cited

OTHER PUBLICATIONS

Office Action for corresponding Korean Application No. 10-2009-0120692 dated Jun. 30, 2016 and English translation thereof.
Office Action for corresponding Korean Application No. 10-2009-0120692 dated Sep. 6, 2016 and English translation thereof.
Korean Notice of Allowance dated Dec. 7, 2016 for corresponding KR Application No. 10-2016-0128906.

* cited by examiner

OBJECT RECOGNITION SYSTEM USING LEFT AND RIGHT IMAGES AND METHOD

CROSS-REFERENCE TO RELATED APPLICATIONS

This application claims the priority benefit of Korean Patent Application No. 2009-0120692, filed on Dec. 7, 2009 in the Korean Intellectual Property Office, the disclosure of which is incorporated herein by reference.

BACKGROUND

1. Field

Embodiments relate to an object recognition system and method which recognize an object from left and right image information received from a stereo camera.

2. Description of the Related Art

In general, in the present day field of computer vision, object recognition has been developed such that a database of objects to be recognized is established offline, the objects are registered after training, the registered objects are recognized using a feature extraction algorithm and a recognizer, and a determination as to whether the registered objects are present in an image which is currently input is made.

If a three-dimensional CAD model is used when establishing the object database, a manual operation of a person is necessary, and thus object feature extraction and registration are not useful in view of an actual robot service. Recently, an object feature extraction and registration technology which does not require a manual operation has been developed, but there is a limitation in providing object recognition that is resilient in the face of environmental variation.

Environmental variation which is considered in object recognition may be roughly divided into photometric invariance which occurs due to illumination variation, noise or the like and geometric invariance related to variation in camera angle or distance from an object. The reason that invariance elements are of importance is that, since types and features of objects used in homes and by individuals are different in view of a robot service, it is difficult for an engineer to directly receive a desired list of objects from a user and to register the list in view of privacy protection. In addition, the user needs to register the objects. That is, since the user directly trains a robot online or offline with respect to objects, it is troublesome that a large number of images are collected so as to cope with object variation. It is important to cope with a large number of variations and to maintain a stable recognition rate by one registration operation.

However, since the existing object recognition system is suitable for a single camera, there is a limitation in object recognition performance.

SUMMARY

Therefore, it is an aspect of at least one embodiment to provide an object recognition system and method which extracts a texture-based feature from a stereo image so as to recognize an object in order to improve object recognition performance.

Additional aspects will be set forth in part in the description which follows and, in part, will be obvious from the description, or may be learned by practice of the invention.

The foregoing and/or other aspects are achieved by providing an object recognition system including: a stereo camera to output left and right images of the same object; and an object recognition device to extract left and right feature vectors of the left and right images received from the stereo camera, to compare the extracted left and right feature vectors with left and right feature vectors of left and right images of objects stored in a database, and to recognize an object present in the left and right images based on the comparison.

The object recognition device may match the extracted left and right feature vectors with the left and right feature vectors of the left and right images of the objects stored in the database, apply scores to the matched feature vectors of the objects according to a Euclidean distance, sum applied scores according to the left and right images, and recognize an object having a high summed score as the object present in the left and right images.

Common feature vectors which are commonly present in the left and right images may be stored in the database according to the objects, and the object recognition device may match the left and right feature vectors extracted from the left and right images so as to find common feature vectors which are present in both the left and right images and compare the found common feature vectors with the common feature vectors stored in the database so as to recognize the object present in the left and right images.

The object recognition device may match the found common feature vectors which are present in both the left and right images with the common feature vectors stored in the database, apply the scores to the matched feature vectors of the common feature vectors of the objects according to the Euclidean distance, sum the applied scores, and recognize an object having a high summed score as the object present in the left and right images.

The object recognition device may include a feature extraction unit to extract a plurality of feature vectors from a plurality of feature points of the left image out of the left and right images and to extract a plurality of feature vectors from a plurality of feature points of the right image, a feature vector matching unit to match the plurality of feature vectors from the left image and from the right image extracted by the feature extraction unit so as to extract a plurality of common feature vectors which are present in both the left and right images, a database to store a plurality of common feature vectors which are present in both the left and right images according to the objects, and an object recognition unit to match the plurality of common feature vectors extracted by the feature vector matching unit with the plurality of common feature vectors stored in the database so as to recognize the object.

The database may store a three-dimensional distance between any two common vectors out of the common vectors which are present in both the left and right images according to the objects, and the object recognition unit may match the plurality of common feature vectors extracted by the feature vector matching unit with the plurality of common feature vectors stored in the database, compare the matched common feature vectors in terms of the three-dimensional distance between any two common feature vectors, apply scores according to a difference in the three-dimensional distance, and recognize the object according to the applied scores.

The feature extraction unit may detect vectors from a plurality of regions related to the plurality of feature points and extract a group of detected vectors as a feature vector.

The object recognition device may match the plurality of left and right feature vectors extracted from the left and right images, a plurality of common feature vectors which are present in both the left and right images, and a three-dimensional distance between any two common vectors out of the plurality of common feature vectors with values of the left and right images of the objects which are stored in the database in advance, apply scores to the matched results, sum the applied scores, and recognize an object having a high summed score as an object present in the left and right images.

The object recognition device may verify the recognized object using at least one of two-dimensional homography and three-dimensional Euclidean Transform with respect to the matched feature vectors between the feature vectors extracted from the left and right images and the feature vectors stored in the database after object recognition.

In accordance with another aspect of the present invention, there is provided an object recognition method including: receiving different left and right images obtained by photographing the same object; extracting left and right feature vectors from the received left and right images; matching the extracted left and right feature vectors with left and light feature vectors of left and right images of objects stored in a database; applying scores to the matched feature vectors of the objects according to a Euclidean distance; and summing the applied scores according to the left and right images and recognizing an object having a high summed score as an object present in the left and right images.

The foregoing and/or other aspects are achieved by providing an object recognition method including: receiving different left and right images obtained by photographing the same object using a photographing device; extracting left and right feature vectors from the received left and right images; matching the extracted left and right feature vectors and extracting a plurality of common feature vectors which are present in both the left and right images; matching the plurality of extracted common feature vectors with a plurality of common feature vectors which are present in both left and right images of objects stored in a database; and recognizing an object present in the left and right images according to the matched results.

The recognizing of the object may include applying scores to the matched common feature vectors of the objects according to a Euclidean distance, summing the applied scores, and recognizing an object having a high summed score as an object present in the left and right images.

The recognizing of the object may include comparing the plurality of matched common feature vectors in terms of three-dimensional distance between any two common feature vectors, applying scores according to a difference in the three-dimensional distance, and recognizing the object according to the applied scores.

The object recognition method may further include verifying the recognized object using at least one of two-dimensional homography and three-dimensional Euclidean Transform with respect to the plurality of matched feature vectors after recognizing the object.

The foregoing and/or other aspects are achieved by providing an object recognition method including: receiving different left and right images obtained by photographing the same object using a photographing device; extracting left and right feature vectors from the received left and right images; matching the extracted left and right feature vectors and extracting a plurality of common feature vectors which are present in both the left and right images and three-dimensional distances thereof; matching the left and right feature vectors, the plurality of common feature vectors, and the three-dimensional distances with values of objects stored in a database; and recognizing an object present in the left and right images according to the matched results.

The recognizing of the object may include finding object candidates using the following equation and recognizing an object having a highest matching score out of the object candidates as the object present in the left and right images, a matching matrix $M(s,m)$ between any object model $G_m$ of a plurality of object models stored in the database and an object model $G_s$ of the received left and right images may be expressed by:

$$M(s,m) = \begin{bmatrix} M_{11} & M_{12} & \ldots & M_{1I} \\ M_{21} & M_{22} & \ldots & M_{2I} \\ \ldots & \ldots & \ldots & \ldots \\ M_{A1} & M_{A2} & \ldots & M_{AI} \end{bmatrix}$$

where, $M_{ai} = \{0, 1\}$, and the matching matrices may be obtained according to object models and the object candidates of the object models are selected according to matching scores.

The matching matrices $M(s,m)$ may be determined by a matching value $M_{ai}$ to enable the following function $\Omega$ to a minimum $$\Omega = -\frac{1}{2}\sum_{a=1}^{A}\sum_{i=1}^{I}\sum_{b=1}^{A}\sum_{j=1}^{I} M_{ai}M_{bj}C_{aibj} + \alpha\sum_{a=1}^{A}\sum_{i=1}^{I} M_{ai}C_{ai}$$

where, $$\forall a \sum_{i=1}^{I} M_{ai} \leq 1, \forall i \sum_{a=1}^{A} M_{ai} \leq 1, \forall ai M_{ai} \in \{0, 1\},$$

$\alpha$ denotes an adjustment parameter, $\forall$ denotes a symbol indicating "any", and $$M_{ai} = \begin{cases} 1 & \text{if vertex } a \in G_s \text{ corresponds to vertex } i \in G_m \\ 0 & \text{otherwise,} \end{cases}$$

$$C_{aibj} = \frac{|v_{ab} - v_{ij}|}{v_{ab} + v_{ij}}$$

$$C_{ai} = |\mu_a - \mu_i|$$

where, $\mu = \{\mu 1, \mu 2, \ldots, \mu a, \ldots, \mu A\}$ denotes a descriptor group (feature vector) of three-dimensional feature points, and $v = \{v12, v13, v1A, vA-1, A\}$ denotes a three-dimensional Euclidean distance between three-dimensional feature points.

According to the at least one embodiment, since invariance performance is improved and stable recognition performance is obtained through one database registration operation using left and right image information received from a stereo camera, intelligent robots may come into wide use in homes containing various objects, and actual services may be provided. In addition, the at least one embodiment may be used in a security or monitoring system using a stereo camera, in addition to the robot.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the at least one embodiment of, examples of which are illustrated in the accompanying drawings.

Figure 1:
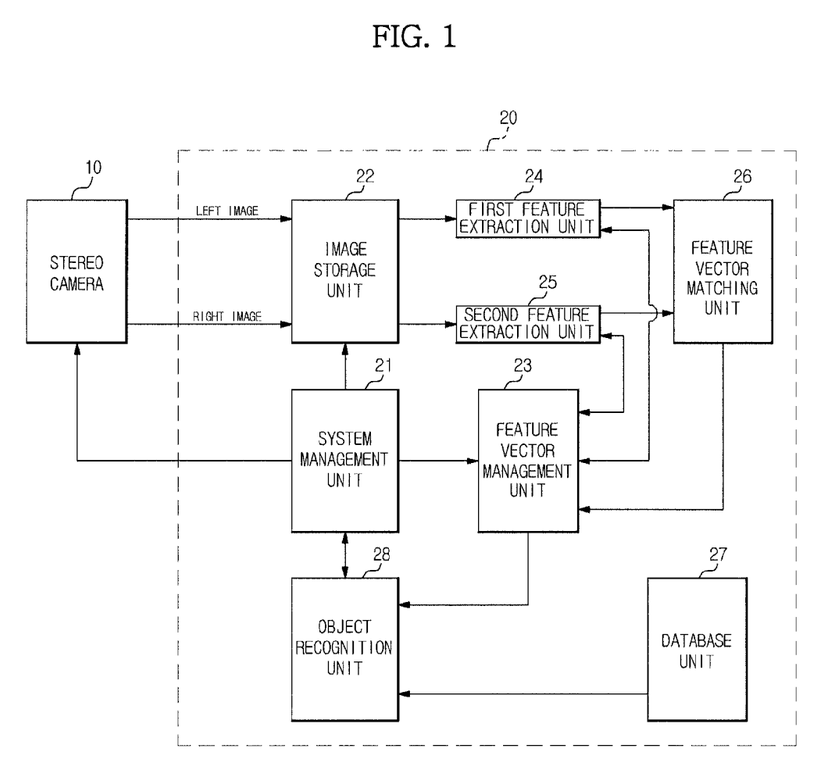
FIG. 1 is a schematic control block diagram of an object recognition system according to at least one embodiment.

FIG. 1 is a schematic control block diagram of an object recognition system according to at least one embodiment.

As shown in FIG. 1, the object recognition system according to the at least one embodiment includes a stereo camera 10 and an object recognition device 20.

The stereo camera 10 outputs a stereo image. The stereo image is composed of left and right images of the same scene, that is, images having different viewpoints. The stereo camera 10 to acquire such a stereo image may be roughly divided into a binocular camera and a monocular camera. The monocular camera 10 acquires images having different viewpoints using one camera 10 and the binocular camera 10 acquires images having different viewpoints using two cameras 10.

The object recognition device 10 extracts a plurality of feature vectors from a plurality of feature points of left and right images received from the stereo camera 10, matches the plurality of feature vectors extracted from the left and right images, and recognizes objects of the left and right images using the plurality of feature vectors of the left and right images and the matched feature vectors.

The object recognition device 20 includes a system management unit 21, an image storage unit 22, a first feature extraction unit 24, a second feature extraction unit 25, a feature vector matching unit 26, a feature vector management unit 23, an object recognition unit 28 and a database unit 27.

The system management unit 21 outputs an image output command such that stereo images are output from the stereo camera 10, and outputs an image storage command such that an image is stored in the image storage unit 22. In addition, the system management unit 21 outputs a feature vector extraction command to the feature vector management unit 23 in order to extract feature vectors. In addition, the system management unit 21 outputs an object recognition command to the object recognition unit 28 and receives an object recognition result from the object recognition unit 28.

The image storage unit 22 receives the left image and the right image output from the stereo camera 10 and transmits the images to the feature extraction units 24 and 25.

The first feature extraction unit 24 extracts feature vectors from the left image information received from the image storage unit 22. The feature vectors of the left image are output to the feature vector matching unit 26 and the feature vector management unit 23.

The second feature extraction unit 25 extracts feature vectors from the right image information received from the image storage unit 22. The feature vectors of the right image are output to the feature vector matching unit 26 and the feature vector management unit 23.

The feature extraction units 24 and 25 detect vectors from a plurality of regions related to a plurality of feature points and extract a group of detected vectors as the feature vectors. The feature extraction units 24 and 25 select feature points from corners of image information of the left and right images. The feature extraction units 24 and 25 extract feature points of interest from the left and right images, detect the vectors from the plurality of regions related to the features, and extract the groups of the detected vectors as the feature vectors. At this time, edges or corners are used as the feature points.

Examples of a method of extracting feature vectors include a Scale Invariant Feature Transform (SIFT) method and a Speeded Up Robust Feature (SURF) method.

Since these two methods use a scale space in order to extract the feature vectors, these two methods are invariant in terms of scale variation and rotation. The scale space is obtained by variously adjusting the size of the image. Since both a large image and a small image are considered, feature vectors which are invariant in terms of scale variation may be obtained. In a method of acquiring an image having a small scale, a Gaussian kernel is used. In the case where image convolution is performed, the larger the variance of the Gaussian kernel, the smaller an image that is obtained. In the SIFT method, if the variance is increased to a certain extent, the size of an original object is decreased and convolution with the Gaussian kernel is performed again. In addition, a Difference of Gaussian (DoG) between neighboring images is computed. A local extrema of the DoG in the scale space is selected as a feature point and a feature vector. The Laplacian is calculated while changing the variance, thereby finding the local extrema. The SURF method is obtained by simplifying a procedure of extracting feature vectors in order to reduce a long computation time of the SIFT method.

The feature vector management unit 23 transmits the feature extraction command to the feature extraction units 24 and 25, receives a plurality of pieces of feature vector information of the images from the feature extraction units 24 and 25, and stores the plurality of pieces of feature vector information. In addition, the feature vector management unit 23 receives and stores information about the feature vectors which are present in both the left and right images according to the matched result of the feature vector matching unit 26. In addition, the feature vector management unit 23 extracts and stores three-dimensional positional coordinates of the feature vectors which are present in both the left and right images using camera calibration data of the stereo camera 10. The feature vector management unit 23 transmits the plurality of pieces of feature vector information of the left and right images, the information about the matched feature vectors and the three-dimensional positional information of the matched feature vectors to the object recognition unit 28.

The feature vector matching unit 26 stereo-matches the feature vectors output from the first feature extraction unit 24 and the second feature extraction unit 25 and finds the feature vectors which are present in both the left and right images. The matched feature vectors are transmitted to the feature vector management unit 23. The feature vector matching unit 26 finds the feature vectors, which are present in both the left and right images, based on the similarity between the feature vectors of the left image and the feature vectors of the right image. A Normalized Cross Correlation (NCC) method using a normalized cross correlation between the feature vectors of the left and the right images or a Euclidean distance method using a Euclidean distance between the feature vectors of the left and right images may be used.

The object recognition unit 28 recognizes an object by comparing the plurality of pieces of feature vector information of the left and right images, the information about the matched feature vectors, and the three-dimensional positional information of the matched feature vectors received from the feature vector management unit 23 with information about objects stored in the database unit 27. That is, the object recognition unit 28 recognizes the presence/absence of objects and name information of present objects.

The plurality of pieces of feature vector information of the left image, the plurality of pieces of feature vector information of the right image, the information about the matched feature vectors and the three-dimensional positional information of the matched feature vectors are stored in the database unit 27 in advance, according to objects. In addition, the object recognition unit 28 verifies the result of recognizing the object using two-dimensional homography and three-dimensional Euclidean transform.

The object recognition device 20 according to the at least one embodiment extracts features resistant to a variation from the left and right images of the same object from the same viewpoint received from the stereo camera 10. In addition, the features which are present in both the left and right images are separately selected so as to configure a feature group resistant to environmental variation. At this time, a matching operation performed in order to configure the feature vector group extracted from the left and right images is performed with respect to only neighboring scale spaces, in consideration of computation time. In addition, the object recognition device 20 matches the feature vectors extracted from the left and right images when recognizing the object and improves object recognition reliability using a relationship between three-dimensional coordinates of the feature points commonly extracted from the left and right images.

Figure 2:
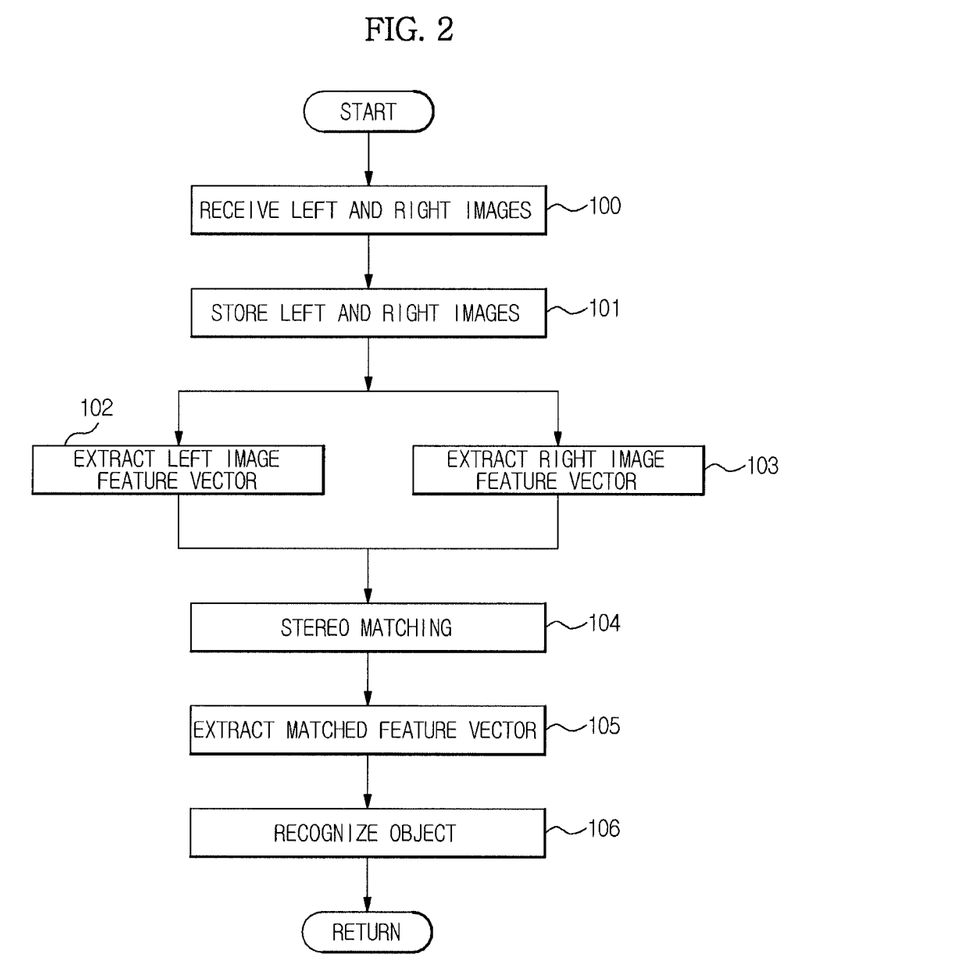
FIG. 2 is a flowchart illustrating an object recognition method according to at least one embodiment.

FIG. 2 is a flowchart illustrating an object recognition method according to at least one embodiment.

Referring to FIG. 2, when the system is started up, the object recognition device 20 according to the at least one embodiment turns on the stereo camera 10, in order to recognize the object. Then, the stereo camera 10 outputs different left and right images of the same scene.

The object recognition device 20 receives the left and right images from the stereo camera 10 (100).

The object recognition device 20 stores the left and right images received from the stereo camera 10 in the image storage unit 22 (101). At this time, the object recognition device 20 transmits the left image of the left and right images stored in the image storage unit 22 to the first feature extraction unit 24 and transmits the right image to the second feature extraction unit 25.

The object recognition device 20 extracts the feature vectors of the left image using the first feature extraction unit 24 (102) and extracts the feature vectors of the right image using the second feature extraction unit 25 (103).

After the feature vectors of the left and right images are extracted, the object recognition device 20 transmits the feature vectors of the left and right images to the feature vector matching unit and performs stereo matching with respect to the left and right images (104). By the stereo matching of the left and right images, the feature vectors (common feature vectors) which are present in both the left and right images and correspond to each other are extracted from the feature vectors of the right image and the feature vectors of the left image.

Through stereo matching, the object recognition device 20 extracts the information about the feature vectors which are present in both the left and right images (information about the matched feature vectors) (105). At this time, in addition to the information about the matched feature vectors, the three-dimensional positions of the matched feature vectors are extracted using the camera calibration data having left and right image parameter information of the stereo camera 10.

The object recognition device 20 compares the information about the matched feature vectors of the left and right images, the information about the feature vectors which are present in both the left and right images, and the three-dimensional positional information of the matched feature vectors with the information of the objects stored in the database unit 27 so as to recognize the object (106). At this time, the object recognition device 20 may accurately recognize the object using any one or both of the Euclidean distance, which is a virtual distance between the feature vectors of the left and right images and the feature vectors of the objects stored in the database unit 27, or the three-dimensional coordinate distance between the feature vectors which are present in both the left and right images, which is an actual distance. That is, object recognition performance is improved using the relationship between three-dimensional coordinates of the matched feature vectors of the left and right images.

Figure 3:
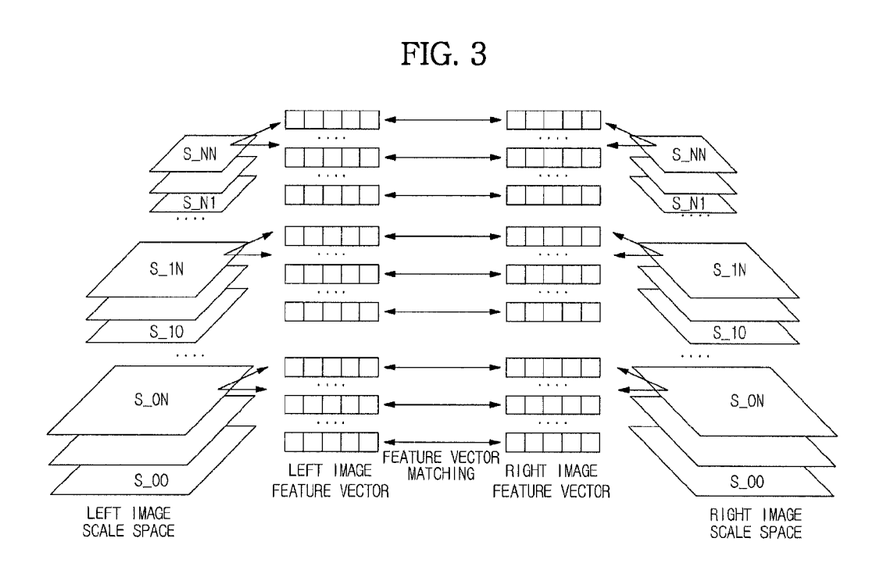
FIG. 3 is a diagram illustrating matching of feature vectors of left and right images in FIG. 2.
Figure 4:
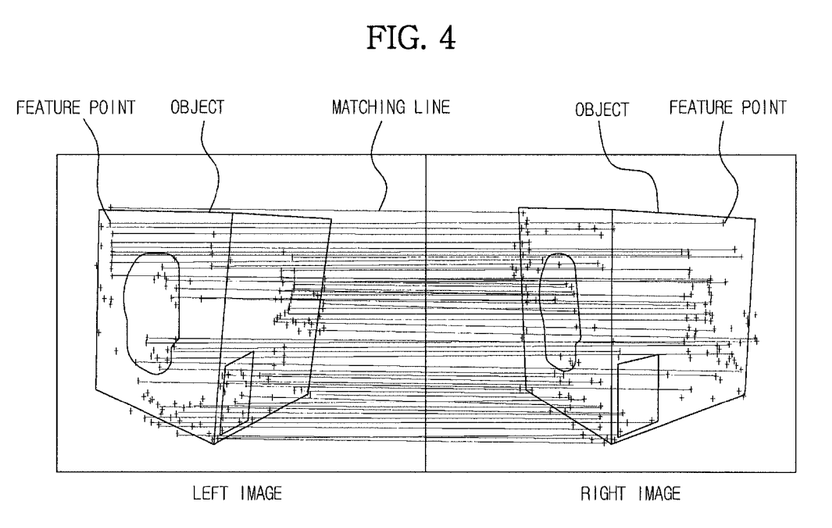
FIG. 4 is a diagram showing the matched result of FIG. 3.

FIG. 3 is a diagram illustrating the matching of the feature vectors of left and right images in FIG. 2, and FIG. 4 is a diagram showing the matched result of FIG. 3.

As shown in FIG. 3, when the object recognition device according to the at least one embodiment performs stereo matching, most similar feature vector pairs are obtained from matched feature vectors out of the feature vectors extracted from the left and right images, and non-matched feature vectors are excluded. At this time, for computation time efficiency, all the feature vectors are not compared, but feature vectors present in a similar scale space are compared. The feature vectors extracted by the matching operation are used to acquire the three-dimensional coordinate information of the feature vectors using the camera calibration data.

As shown in FIG. 3, a feature vector group $F_{left}$ of the left image and a feature vector group $F_{right}$ of the right image are expressed as follows.

$$F_{left} = \{F_{left\_S00}, F_{left\_S01}, \ldots, F_{left\_S0N}, \ldots, F_{left\_S10}, F_{left\_S11}, \ldots, F_{left\_SNN}\}$$

$$F_{right} = \{F_{right\_S00}, F_{right\_S01}, \ldots, F_{right\_S0N}, \ldots, F_{right\_S10}, F_{right\_S11}, \ldots, F_{right\_SNN}\}$$

In addition, the feature vector group $F_{left\_Sii}$ of an ii-th scale space of the left image and the feature vector group $F_{right\_Sii}$ of an ii-th scale space of the right image are expressed as follows.

$$F_{left\_Sii} = \{\vec{f}_{left,1}, \vec{f}_{left,2}, \vec{f}_{left,3}, \vec{f}_{left,4}, \ldots \vec{f}_{left,i} \ldots \vec{f}_{left,N}\}$$

$$F_{right\_Sii} = \{\vec{f}_{right,1}, \vec{f}_{right,2}, \vec{f}_{right,3}, \vec{f}_{right,4}, \ldots \vec{f}_{right,i} \ldots \vec{f}_{right,M}\}$$

In addition, an i-th feature vector (D-dimension) $\vec{f}_{left,i}$ of $F_{left}$ and an i-th feature vector (D-dimension) $\vec{f}_{right,i}$ of $F_{right}$ are expressed as follows.

$$\vec{f}_{left,i} = \{a_{i1}, a_{i2}, a_{i3}, \ldots a_{ii}, \ldots a_{iD}\}$$

$$\vec{f}_{right,i} = \{b_{i1}, b_{i2}, b_{i3}, \ldots b_{ii}, \ldots b_{iD}\}$$

In addition, the matched feature vector groups $F_{double\_left}$ and $F_{double\_right}$ are expressed as follows.

$$F_{double\_left} = \{\vec{f}_{double\_left,1}, \vec{f}_{double\_left,2}, \vec{f}_{double\_left,3}, \vec{f}_{double\_left,4}, \ldots \vec{f}_{double\_left,i} \ldots \vec{f}_{double\_left,T}\}$$

$$F_{double\_right} = \{\vec{f}_{double\_right,1}, \vec{f}_{double\_right,2}, \vec{f}_{double\_right,3}, \vec{f}_{double\_right,4}, \ldots \vec{f}_{double\_right,i} \ldots \vec{f}_{double\_right,T}\}$$

Figure 5:
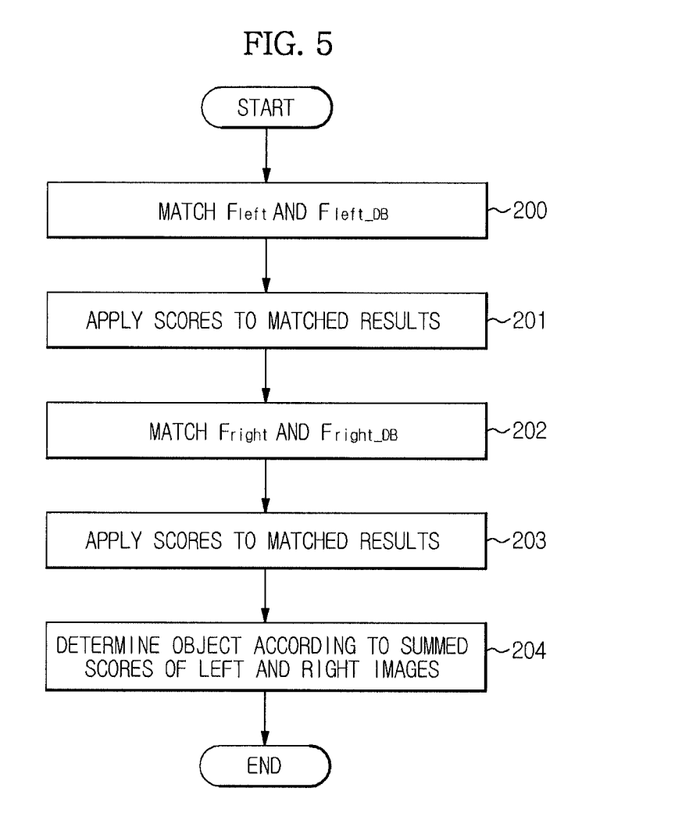
FIG. 5 is a flowchart illustrating the object recognition method of FIG. 2.

FIG. 5 is a flowchart illustrating the object recognition method of FIG. 2.

As shown in FIG. 5, the object recognition device 20 performs operation 200 of matching the feature vector group $F_{left}$ of the left image and the feature vector group $F_{left\_DB}$ of the left image of each object stored in the database unit 27, operation 201 of applying scores to the matched results, operation 202 of matching the feature vector group $F_{right}$ of the right image and the feature vector group $F_{right\_DB}$ of the right image of each object stored in the database unit 27, and operation 203 of applying scores to the matched results, and operation 204 of determining the object using the score obtained by summing the scores of the left and right images, such that the feature vectors of the left and right images and the feature vectors of the left and right images of the objects stored in the database unit are sequentially matched, a large score is applied to a feature vector having a high matching degree due to a small Euclidean distance when the left and right images are matched, and the scores of the feature vectors of the left and right images are summed, thereby accurately recognizing the object.

Figure 6:
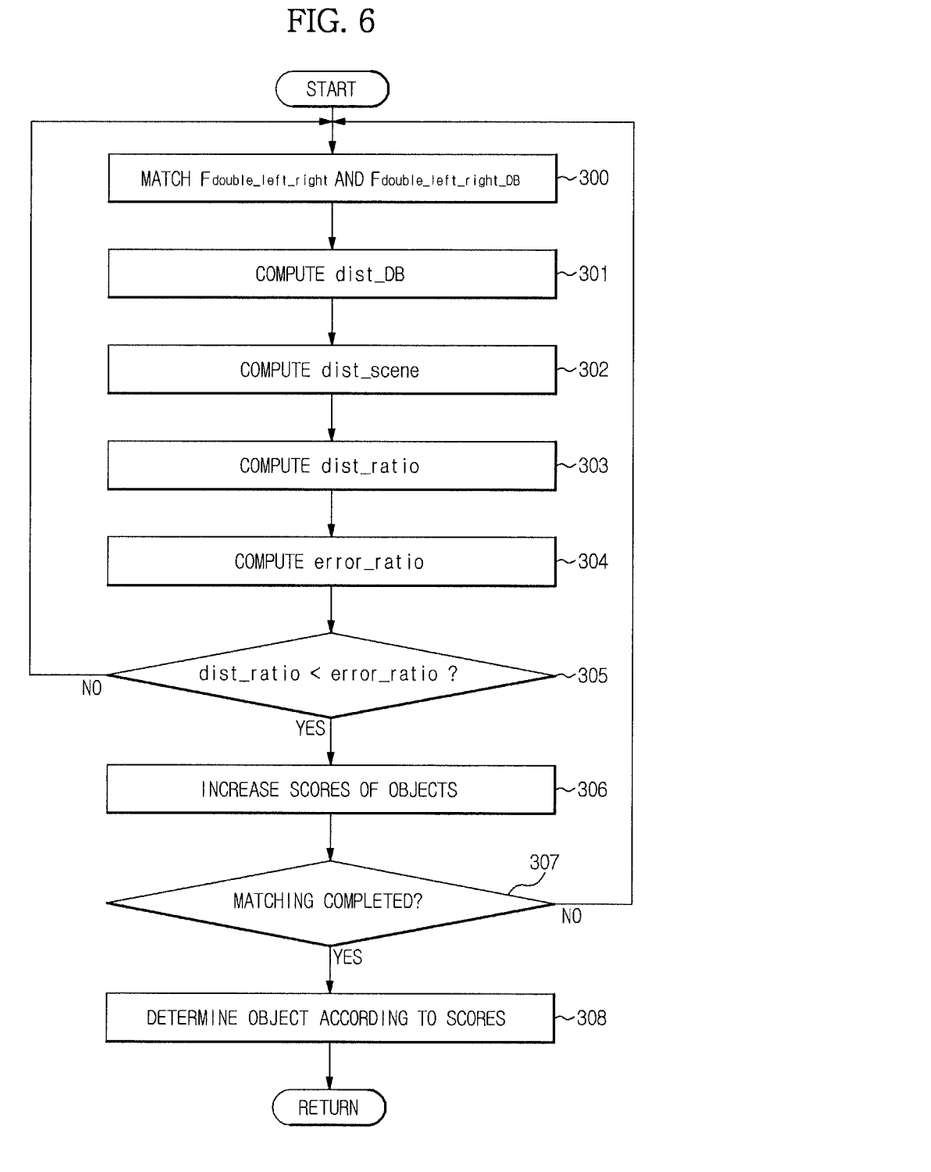
FIG. 6 is a flowchart illustrating a procedure of recognizing an object using a method different from that of FIG. 5.

FIG. 6 is a flowchart illustrating a procedure of recognizing an object using a method different from that of FIG. 5.

The object recognition device 20 accurately recognizes the object using the distance similarity between the three-dimensional coordinates, which are the actual distances between the matched feature vectors of the left and right images. Such a method is called a Pair-wise Feature matching and voting method. In such a Pair-wise Feature matching and voting method, if it is assumed that the coordinates of any two feature vectors f1 and f2 of the left and right images are (x1, y1, z1) and (x2, y2, z2), the coordinates of two feature vectors f3 and f4 corresponding to the object stored in the database unit are (x3, y3, z3) and (x4, y4, z4), and f1 and f2 are respectively matched with f3 and f4, the accuracy and reliability of object recognition are improved by increasing a voting score if the three-dimensional coordinate distance between f3 and f4 and the three-dimensional coordinate distance between f1 and f2 are similar to each other. In the stereo camera, the larger the distance from the object, the lower the accuracy of the three-dimensional coordinate.

Accordingly, ratios expressed by Equations 1 to 3 are used instead of absolute threshold values.

$$\text{dist\_ratio} = |\text{dist\_scene} - \text{dist\_db}|/\text{dist\_db} \quad \text{Equation 1}$$

$$\text{error\_ratio} = \text{dist\_ratio\_const} \times \text{alpha} \quad \text{Equation 2}$$

$$\text{dist\_ratio} < \text{error\_ratio} \quad \text{Equation 3}$$

where, dist_scene denotes a three-dimensional distance between two feature vectors of an image, dist_db denotes a distance between two feature vectors stored in the database unit corresponding thereto, dist_ratio_const denotes a similarity determination constant of dist_ratio, and alpha is a basis function used to apply a weight according to a distance.

Figure 7:
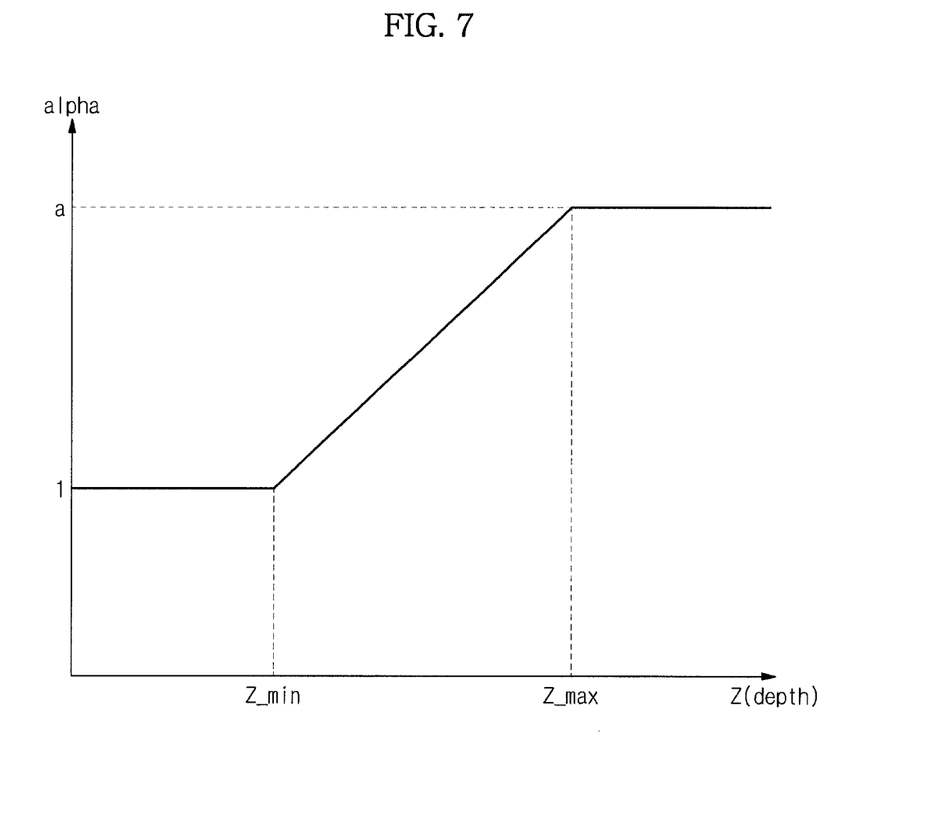
FIG. 7 is a diagram illustrating a case of applying weights to a three-dimensional distance between feature vectors matched in the object recognition system according to the at least one embodiment and a three-dimensional distance between feature vectors stored in a database unit.

As shown in FIG. 7, in the basis function alpha, it can be seen that the same value is applied as dist_ratio if the distance is equal to or less than z_min, but the reference value is linearly increased from z_min to z_max. In addition, if the distance is equal to or greater than z_max, the basis value is no longer increased and the same basis value is used.

Accordingly, the object recognition device 20 performs operation 300 of matching feature vector groups $F_{double\_left\_right}$ and $F_{double\_left\_right\_DB}$ of the matched left and right images, operation 301 of computing a distance dist_DB between any two feature vectors in the feature vector group $F_{double\_left\_right\_DB}$ of the matched left and right images of the objects stored in the database unit 27, operation 302 of computing a distance dist_scene between any two feature vectors in the feature vector group $F_{double\_left\_right}$ of the current left and right images, operation 303 of computing Equation 1 using the computed distances, operation 304 of computing Equation 2 using the computed Equation 1, operation 305 of determining whether the condition of Equation 3 is satisfied, returning to operation 300 and performing operation 300 and the subsequent operations if Equation 3 is not satisfied and operation 306 of increasing the score of the object if Equation 3 is satisfied, operation 307 of determining whether matching is completed after increasing the score of the object, returning to operation 300 and performing operation 300 and the subsequent operations if matching is not completed, and operation 308 of determining the object according to the score thereof if matching is completed.

The object recognition device 20 may recognize the object using a graph method, instead of the Pair-wise Feature matching and voting method.

The graph method is obtained by generalizing a pair-wise feature matching method. In this method, a matched graph is found using matched feature points and a relationship between feature points. The graph method requires greater computation time than the pair-wise feature matching method, but has better recognition performance than the pair-wise feature matching method.

In the graph method, the graph model G of the object may be expressed as follows.

$$G = (V, E, \mu, v)$$

where, $V = \{1, 2, 3, \ldots, a, \ldots, A\}$, $a = (x_a, y_a, z_a)$ denotes a group of stereo-matched three-dimensional feature points, $E = \{f_{12}, f_{13}, \ldots, f_{1,A}, \ldots, f_{A-1,A}\}$ denotes a group of edge combinations between three-dimensional feature points, $\mu = \{\mu_1, \mu_2, \ldots, \mu_2, \ldots, \mu_a, \ldots, \mu_A\}$ denotes a descriptor group (feature vector) of three-dimensional feature points, and $v = \{v_{12}, v_{13}, \ldots, v_{1,A}, \ldots, v_{A-1,A}\}$ denotes a three-dimensional Euclidean distance between three-dimensional feature points.

If the models of the objects stored in the database are G1, G2, G3, GM and the model of an input image is Gs (having A three-dimensional feature points), a matching matrix M(s,m) of the model Gm (having i three-dimensional feature points) of any object may be defined as follows.

$$M(s, m) = \begin{bmatrix} M_{11} & M_{12} & \ldots & M_{1I} \\ M_{21} & M_{22} & \ldots & M_{2I} \\ \ldots & \ldots & \ldots & \ldots \\ M_{A1} & M_{A2} & \ldots & M_{AI} \end{bmatrix}$$

where, Mai={0, 1}.

At this time, a matching value Mai between an a-th three-dimensional feature point of an input image and a three-dimensional point of an i-th object model is 1 when matching occurs and is 0 when matching does not occur.

The graph method indicates a method of obtaining matching matrices M(s,m) (that is, M(s,1), M(s,2), M(s,M)) according to models and selecting a matching matrix M(s,m) having a best matching score $$\left( \sum_a \sum_i M_{ai} > Th \right)$$

therefrom.

As a method of finding the matching matrices M(s,m), a Mai value to minimize the following function $\Omega$ is obtained.

$$\Omega = -\frac{1}{2} \sum_{a=1}^{A} \sum_{i=1}^{I} \sum_{b=1}^{A} \sum_{j=1}^{I} M_{ai} M_{bj} C_{aibj} + \alpha \sum_{a=1}^{A} \sum_{i=1}^{I} M_{ai} C_{ai}$$

where, $$\forall a \sum_{i=1}^{I} M_{ai} \leq 1,$$

$$\forall i \sum_{a=1}^{A} M_{ai} \leq 1,$$

$$\forall ai M_{ai} \in \{0, 1\},$$

$\alpha$ denotes an adjustment parameter, $\forall$ denotes a symbol indicating "any", and $$M_{ai} = \begin{cases} 1 & \text{if vertex } a \in G_s \text{ corresponds to vertex } i \in G_m \\ 0 & \text{otherwise.} \end{cases}$$

In the at least one embodiment, $C_{aibj}$ and $C_{ai}$ of the above function $\Omega$ are suggested as follows.

$$C_{aibj} = \frac{|v_{ab} - v_{ij}|}{v_{ab} + v_{ij}}$$

$$C_{ai} = |\mu_a - \mu_i|$$

In order to find a value which minimizes the above function $\Omega$, the following equation Qai obtained by differentiating Mai is used.

$$Q_{ai} = -\frac{\partial \Omega}{\partial M_{ai}} \approx \sum_{b=1}^{A} \sum_{j=1}^{I} C_{aibj} M_{bj} - \alpha C_{ai}$$

If the above function is used, the function $\Omega$ may be expressed as follows.

$$\Omega \approx -\sum_{a=1}^{A} \sum_{i=1}^{I} M_{ai} Q_{ai}$$

where, $$\forall a \sum_{i=1}^{I} M_{ai} \leq 1,$$

$$\forall i \sum_{a=1}^{A} M_{ai} \leq 1,$$

$$\forall ai M_{ai} \in \{0, 1\}.$$

Since the number of nodes matched in any row or column of M(s,m) by the above method is only one, a multi-correspondence check process is applied.

After finding the matching matrix M(s,m) which maximizes the function $\Omega$ according to models, object candidates satisfying the following condition are found, and an object having a highest matching score out of the object candidates is recognized as an object present in the left and right images.

$$\sum_{a=1}^{A} \sum_{i=1}^{I} M_{ai} > Th$$

The object recognition device 20 uses the matched feature vectors so as to verify the recognized object using two-dimensional homography and three-dimensional transform and to additionally derive three-dimensional positional information, The object recognition device 20 performs verification using three-dimensional Euclidean transform. At this time, if feature vectors having matched three-dimensional information are not sufficient, the three-dimensional operation is omitted and a two-dimensional homograph verification operation is performed. Even when feature vectors having matched three-dimensional information are sufficient, if a suitable rotation matrix (hereinafter, referred to as "R") and a translation matrix (hereinafter, referred to as "T") are not obtained, the two-dimensional homography verification operation is performed.

If the three-dimensional coordinate of the object stored in the database unit is $\vec{x}_1=(x1,y1,z1)$ and the three-dimensional coordinate of the object of the current image is $\vec{x}_2=(x2,y2,z2)$, R and T are obtained using four matching pairs or more.

$$R = \begin{bmatrix} r_{xx} & r_{xy} & r_{xz} \\ r_{yx} & r_{yy} & r_{yz} \\ r_{zx} & r_{zy} & r_{zz} \end{bmatrix}$$

-continued $$T = \begin{bmatrix} t_x \\ t_y \\ t_z \end{bmatrix}$$

If the obtained R and T are ideal, $\vec{x}'_1$ obtained using the following equation is equal to $\vec{x}'_1$.

$$\vec{x}'_1 = R\vec{x}_1 + T$$

Accordingly, the above R and T obtained using any four points are substituted with the remaining three-dimensionally matched feature points of the object stored in the database unit so as to obtain coordinate values and to increase the number of inliers of small matching pairs having errors with coordinates of the actually matched image equal to or less than a predetermined condition (threshold). At this time, an embodiment of obtaining an inlier counting condition is as follows.

$$\frac{(x_2 - x'_1)^2 + (x_2 - x'_1)^2 + (x_2 - x'_1)^2}{x_1^2 + y_1^2 + z_1^2} \leq TH$$

Finally, a determination as to whether R and T are suitable may be made by the following method.

If the following condition is satisfied, it is determined that R and T are suitable. In this case, the object recognition device 20 determines that the object is accurately recognized.

$$\frac{\text{number of feature points satisfying inlier}}{\text{number of matched feature vectors}} \leq Nt$$

Meanwhile, if the above process is not normally performed, the object recognition device 20 performs the two-dimensional homography verification operation and determines whether the object is accurately recognized.

The object recognition method according to the above-described at least one exemplary embodiment may be recorded in computer-readable media including program instructions to implement various operations embodied by a computer. The media may also include, alone or in combination with the program instructions, data files, data structures, and the like. Examples of computer-readable media include magnetic media, such as hard disks, floppy disks, and magnetic tape; optical media, such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa. If the described hardware devices are configured to act as one or more software modules, then the software modules use a processor to execute their respective operations.

Although at least one embodiment has been shown and described, it would be appreciated by those skilled in the art that changes may be made in the at least one embodiment without departing from the principles and spirit of the invention, the scope of which is defined in the claims and their equivalents.

What is claimed is:

1. An object recognition system, comprising:
    a stereo camera configured to output left and right images of a same object; and
    an object recognition device configured to extract left and right feature vectors from the left and right images received from the stereo camera, match the left feature vectors extracted from the left images with the right feature vectors extracted from the right images to find a plurality of common feature vectors which are present in both the left and right images, match the plurality of found common feature vectors with a plurality of common feature vectors which are present in both left and right images according to objects stored in a database, and recognize an object present in the left and right images based on results of the matching,
    wherein the object recognition device is configured to match the left feature vectors and the right feature vectors such that the left feature vectors in a scale space is compared with the right feature vector in a same scale space, and
    wherein the object recognition device is configured to recognize the object by finding object candidates using the following equation and recognizing an object having a highest matching score out of the object candidates as the object present in the left and right images,
    a matching matrix M(s,m) between any object model Gm of a plurality of object models stored in the database and an object model Gs of the received left and right images is expressed by:

$$M(s, m) = \begin{bmatrix} M_{11} & M_{12} & \ldots & M_{1I} \\ M_{21} & M_{22} & \ldots & M_{2I} \\ \ldots & \ldots & \ldots & \ldots \\ M_{A1} & M_{A2} & \ldots & M_{AI} \end{bmatrix}$$

where, Mai={1, 0}, and
the matching matrix is obtained according to object models and the object candidates of the object models are selected according to matching scores.

2. The object recognition system according to claim 1, wherein the object recognition device is configured to match the found common feature vectors which are present in both the left and right images with the common feature vectors stored in the database, apply scores to the matched feature vectors of the common feature vectors of the objects according to a Euclidean distance, sum the applied scores, and recognize an object having a high summed score as the object present in the left and right images.

3. The object recognition system according to claim 1, wherein the object recognition device includes:
    a feature extraction unit configured to extract a plurality of feature vectors from a plurality of feature points of the left images and extract a plurality of feature vectors from a plurality of feature points of the right images;
    a feature vector matching unit configured to match the plurality of feature vectors extracted from the left images and from the right images by the feature extraction unit to extract a plurality of common feature vectors which are present in both the left and right images;

a database configured to store a plurality of common feature vectors which are present in both the left and right images according to the objects; and an object recognition unit configured to match the plurality of common feature vectors extracted by the feature vector matching unit with the plurality of common feature vectors stored in the database to recognize the object present in the left and right images.

4. The object recognition system according to claim 3, wherein:

the database is configured to store a three-dimensional distance between any two common vectors out of the common vectors which are present in both the left and right images according to the objects, and the object recognition unit is configured to match the plurality of common feature vectors extracted by the feature vector matching unit with the plurality of common feature vectors stored in the database, compare the matched common feature vectors in terms of the three-dimensional distance between any two common feature vectors, apply scores according to a difference in the three-dimensional distance, and recognize the object according to the applied scores.

5. The object recognition system according to claim 4, wherein the feature extraction unit is configured to detect vectors from a plurality of regions related to the plurality of feature points and extract a group of detected vectors as feature vectors.

6. The object recognition system according to claim 1, wherein the object recognition device is configured to match the left and right feature vectors extracted from the left and right images, the plurality of found common feature vectors, and a three-dimensional distance between any two common vectors out of the plurality of common feature vectors with corresponding values of the left and right images according to the objects which are stored in the database in advance, apply scores to results of the matching, sum the applied scores, and recognize an object having a high summed score as an object present in the left and right images.

7. The object recognition system according to claim 1, wherein the object recognition device is configured to verify the recognized object using at least one of two-dimensional homography and three-dimensional Euclidean Transform with respect to the matched feature vectors between the feature vectors extracted from the left and right images and the feature vectors stored in the database after object recognition.

8. An object recognition method, comprising:

receiving different left and right images obtained by photographing a same object using a photographing device;

extracting left and right feature vectors from the received left and right images;

comparing and matching the left feature vectors in a scale space, the left feature vectors extracted from the left images, with the right feature vectors in the scale space, the right feature vectors extracted from the right images, and extracting a plurality of common feature vectors which are present in both the left and right images;

matching the plurality of extracted common feature vectors with a plurality of common feature vectors which are present in both left and right images stored in a database according to objects; and recognizing an object present in the left and right images based on results of the matching, wherein the recognizing includes finding object candidates using the following equation and recognizing an object having a highest matching score out of the object candidates as the object present in the left and right images, a matching matrix M(s,m) between any object model Gm of a plurality of object models stored in the database and an object model Gs of the received left and right images is expressed by:

$$M(s, m) = \begin{bmatrix} M_{11} & M_{12} & \ldots & M_{1I} \\ M_{21} & M_{22} & \ldots & M_{2I} \\ \ldots & \ldots & \ldots & \ldots \\ M_{A1} & M_{A2} & \ldots & M_{AI} \end{bmatrix}$$

where, Mai={0, 1}, and the matching matrix is obtained according to object models and the object candidates of the object models are selected according to matching scores.

9. The object recognition method according to claim 8, wherein the recognizing of the object includes applying scores to the matched common feature vectors of the objects according to a Euclidean distance, summing the applied scores, and recognizing an object having a high summed score as an object present in the left and right images.

10. The object recognition method according to claim 8, wherein the recognizing of the object includes comparing the matched common feature vectors in terms of three-dimensional distance between any two common feature vectors, applying scores according to a difference in the three-dimensional distance, and recognizing the object according to the applied scores.

11. The object recognition method according to claim 8, further comprising:

verifying the recognized object using at least one of two-dimensional homography and three-dimensional Euclidean Transform with respect to the plurality of matched feature vectors after recognizing the object.

12. An object recognition method, comprising:

receiving different left and right images obtained by photographing a same object using a photographing device;

extracting left and right feature vectors from the received left and right images;

comparing and matching the left feature vectors in a scale space, the left feature vectors extracted from the left images, with the right feature vectors in the scale space, the right feature vectors extracted from the right images, and extracting a plurality of common feature vectors which are present in both the left and right images and three-dimensional distances thereof;

comparing the left and right feature vectors, the plurality of common feature vectors, and the three-dimensional distances with corresponding values of the left and right images according to objects stored in a database; and recognizing an object present in the left and right images based on results of the comparing, wherein the recognizing of the object includes finding object candidates using the following equation and recognizing an object having a highest matching score out of the object candidates as the object present in the left and right images, a matching matrix M(s,m) between any object model Gm of a plurality of object models stored in the database and an object model Gs of the received left and right images is expressed by:

$$M(s, m) = \begin{bmatrix} M_{11} & M_{12} & \ldots & M_{1I} \\ M_{21} & M_{22} & \ldots & M_{2I} \\ \ldots & \ldots & \ldots & \ldots \\ M_{A1} & M_{A2} & \ldots & M_{AI} \end{bmatrix}$$

where, Mai={0, 1}, and the matching matrix is obtained according to object models and the object candidates of the object models are selected according to matching scores.

13. The object recognition method according to claim 12, wherein the matching matrix M(s,m) is determined by a matching value Mai to minimize the following function Ω

$$\Omega = -\frac{1}{2}\sum_{a=1}^{A}\sum_{i=1}^{I}\sum_{b=1}^{A}\sum_{j=1}^{I} M_{ai}M_{bj}C_{aibj} + \alpha\sum_{a=1}^{A}\sum_{i=1}^{I} M_{ai}C_{ai}$$

where, $$\forall a \sum_{i=1}^{I} M_{ai} \leq 1,$$

$$\forall i \sum_{a=1}^{A} M_{ai} \leq 1,$$

$$\forall ai M_{ai} \in \{0, 1\},$$

αdenotes an adjustment parameter, ∀ denotes a symbol indicating "any", and $$M_{ai} = \begin{cases} 1 & \text{if vertex } a \in G_s \text{ corresponds to vertex } i \in G_m \\ 0 & \text{otherwise,} \end{cases}$$

$$C_{aibj} = \frac{|v_{ab} - v_{ij}|}{v_{ab} + v_{ij}}$$

$$C_{ai} = |\mu_a - \mu_i|$$

where, $\mu=\{\mu_1, \mu_2, \ldots, \mu_a, \ldots, \mu_A\}$ denotes a descriptor group (feature vector) of three-dimensional feature points, and $v=\{v_{1,2}, v_{1,3}, \ldots, v_{1,A}, \ldots, v_{A-1,A}\}$ denotes a three-dimensional Euclidean distance between three-dimensional feature points.

* * * * *